United States Patent
Bouiller et al.

(10) Patent No.: US 7,390,167 B1
(45) Date of Patent: Jun. 24, 2008

(54) COMPRESSOR WITH CENTRIPETAL AIR TAKEOFF

(75) Inventors: Philippe Pierre Vincent Bouiller, Samoreau (FR); Gilles Alain Marie Charier, La Grande Paroisse (FR); Didier Rene Andre Escure, Nandy (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 57 days.

(21) Appl. No.: 11/461,592

(22) Filed: Aug. 1, 2006

(30) Foreign Application Priority Data

Aug. 3, 2005 (FR) .................................. 05 08279

(51) Int. Cl.
*F01D 5/08* (2006.01)
(52) U.S. Cl. .................. 416/96 R; 416/95; 415/115; 415/116; 285/20; 285/61; 285/192; 285/325
(58) Field of Classification Search ................. 415/115, 415/116, 176, 95, 96 R; 416/96 A, 97 R, 416/95, 96 R; 285/19–20, 61–62, 189, 192, 285/325
See application file for complete search history.

(56) References Cited

U.S. PATENT DOCUMENTS

| | | | |
|---|---|---|---|
| 2,670,222 A * | 2/1954 | Dragon ........................ | 285/61 |
| 3,398,881 A | 8/1968 | Greenberg et al. | |
| 4,309,147 A * | 1/1982 | Koster et al. .................. | 416/95 |
| 4,576,547 A | 3/1986 | Weiner et al. | |
| 5,267,832 A | 12/1993 | Johnson et al. | |
| 5,472,313 A * | 12/1995 | Quinones et al. ............ | 415/115 |
| 5,853,285 A * | 12/1998 | Miller et al. .............. | 416/96 R |
| 7,086,830 B2 * | 8/2006 | Fitzgerald et al. ........... | 415/115 |
| 7,159,402 B2 * | 1/2007 | Hein et al. ..................... | 60/785 |
| 2002/0182059 A1 | 12/2002 | Escure et al. | |
| 2007/0053770 A1 * | 3/2007 | Lammas et al. ............. | 415/115 |

* cited by examiner

*Primary Examiner*—Christopher Verdier
(74) *Attorney, Agent, or Firm*—Oblon, Spivak, McClelland, Maier & Neustadt, P.C.

(57) ABSTRACT

A compressor with a centripetal air takeoff system that includes pipes installed between an outer collar and an inner collar. Each pipe is fitted in a hole in the outer collar and in a hole in the inner collar. The system further includes a locking mechanism between the pipe and the inner collar.

20 Claims, 3 Drawing Sheets

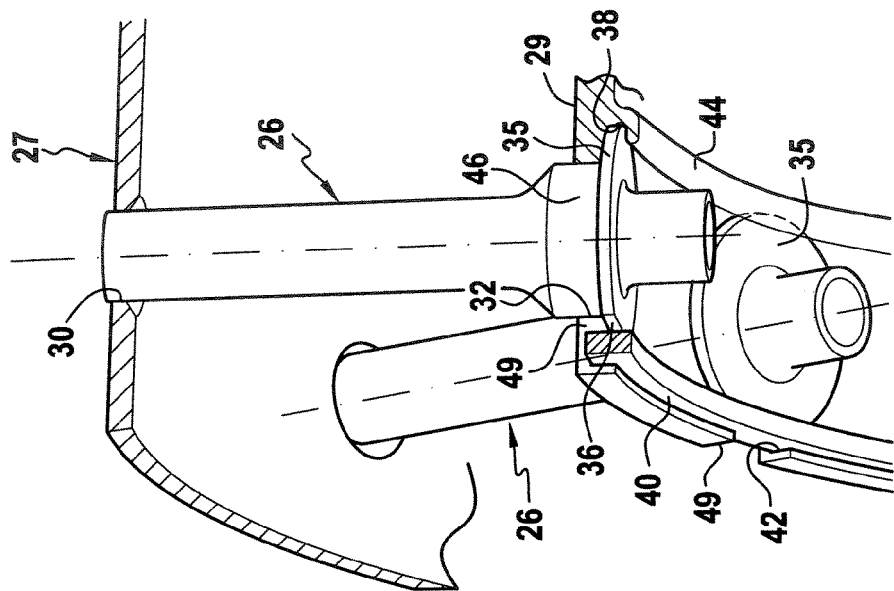
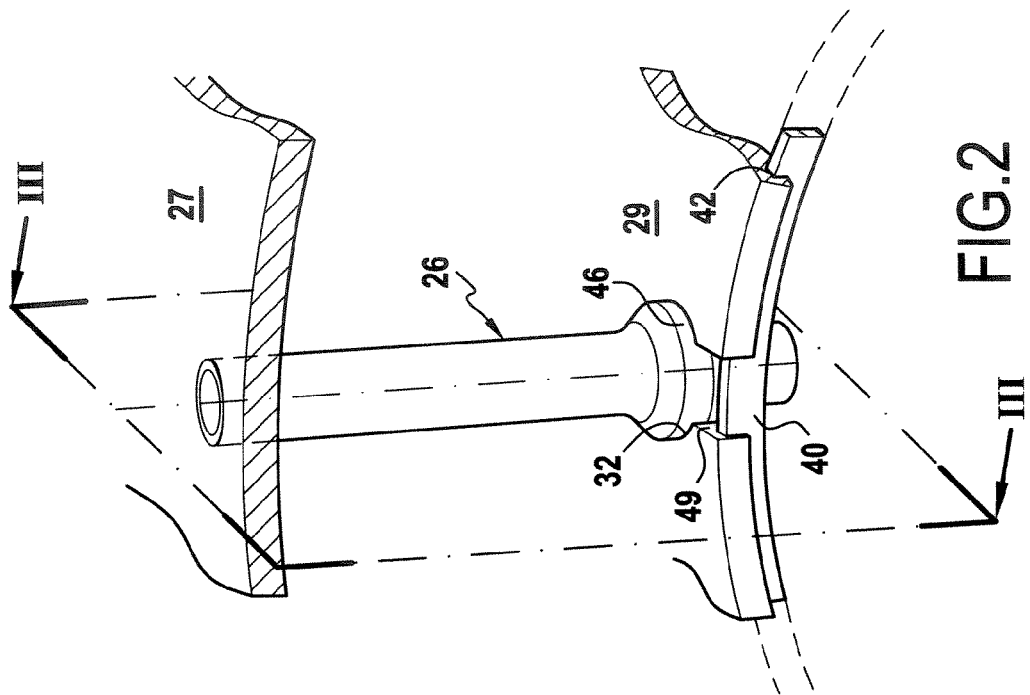

COMPRESSOR WITH CENTRIPETAL AIR TAKEOFF

The invention relates to a compressor with centripetal air offtake, in particular for an aircraft turbojet engine. It concerns more particularly a new, simpler arrangement of the radially oriented offtake pipes, making it possible to take off air from the air stream of the compressor, in order to convey it between the bores in the rotor disks and the shaft.

In an aircraft turbojet engine, it is necessary, for the engine requirements (cooling of certain elements and pressurization of the lubrication chambers) to take off air at the high pressure compressor.

According to a known technique, the air is taken off via apertures in the wall of the rotor delimiting the inside of the stream and is conveyed via centripetal offtake pipes in order to circulate it along the shaft passing through the rotor.

This solution has the advantage of reducing the space requirement at the periphery of the compressor and of recovering air at the desired pressure by playing with the length of the pipes and the offtake radius.

For example, U.S. Pat. No. 6,648,592 describes an arrangement of this type where the pipes are threaded on a ring that is bolted on one of the disks of the high pressure compressor. A drawback of this assembly is that the number of parts is relatively high. Another solution consists of crimping the pipes to an outer collar whilst holding them internally by attaching them to an inner collar fixed to one of the disks of the compressor. The drawback of this system is the difficulty of assembly.

The object of the invention is to provide an improved arrangement facilitating assembly, in particular by eliminating the crimping.

More precisely, the invention concerns a compressor with centripetal air offtake, of the type comprising several radially oriented pipes, regularly distributed circumferentially, said pipes being installed between two coaxial collars of the rotor of said compressor, respectively an outer collar and an inner collar, the space outside said outer collar communicating with the stream of said compressor, characterized in that one end of each pipe is fitted in a hole in said outer collar, in that each pipe is fitted in a hole in said inner collar and in that locking means are defined between such a pipe and said inner collar.

According to a preferred embodiment, the locking means comprise:
 a flange fixed to each pipe, provided with a flat section;
 an annular slot with lateral opening, defined on the internal face of said inner collar and a removable annular limit stop projecting from said internal face, parallel to said annular slot.

Said flange is fitted in said slot and its flat section is opposite said annular limit stop.

The aforementioned annular limit stop can be a retaining ring mounted in a groove in the inner collar.

Also, in order to facilitate assembly, it is advantageous that each pipe comprises a boss with circular cross-section and in that each hole made in said inner collar has a diameter corresponding to that of said boss. After assembly, the boss is fitted in this hole.

In this case, assembly is further facilitated if a channel is provided between the edge of the inner collar and each hole, said channel having a width sufficient to make it possible to fit said pipe into the hole.

The invention also concerns an aircraft turbojet engine, characterized in that it comprises a compressor with centripetal air offtake of the type defined previously.

The invention will be better understood and other advantages thereof will emerge more clearly in the light of the following description given solely by way of example and produced with reference to the accompanying drawings in which:

FIG. 2 is a detailed view in perspective showing in more detail the assembly of one of the pipes;

FIG. 3 is a detailed view along a section III-III of FIG. 2; and

Figure 1:
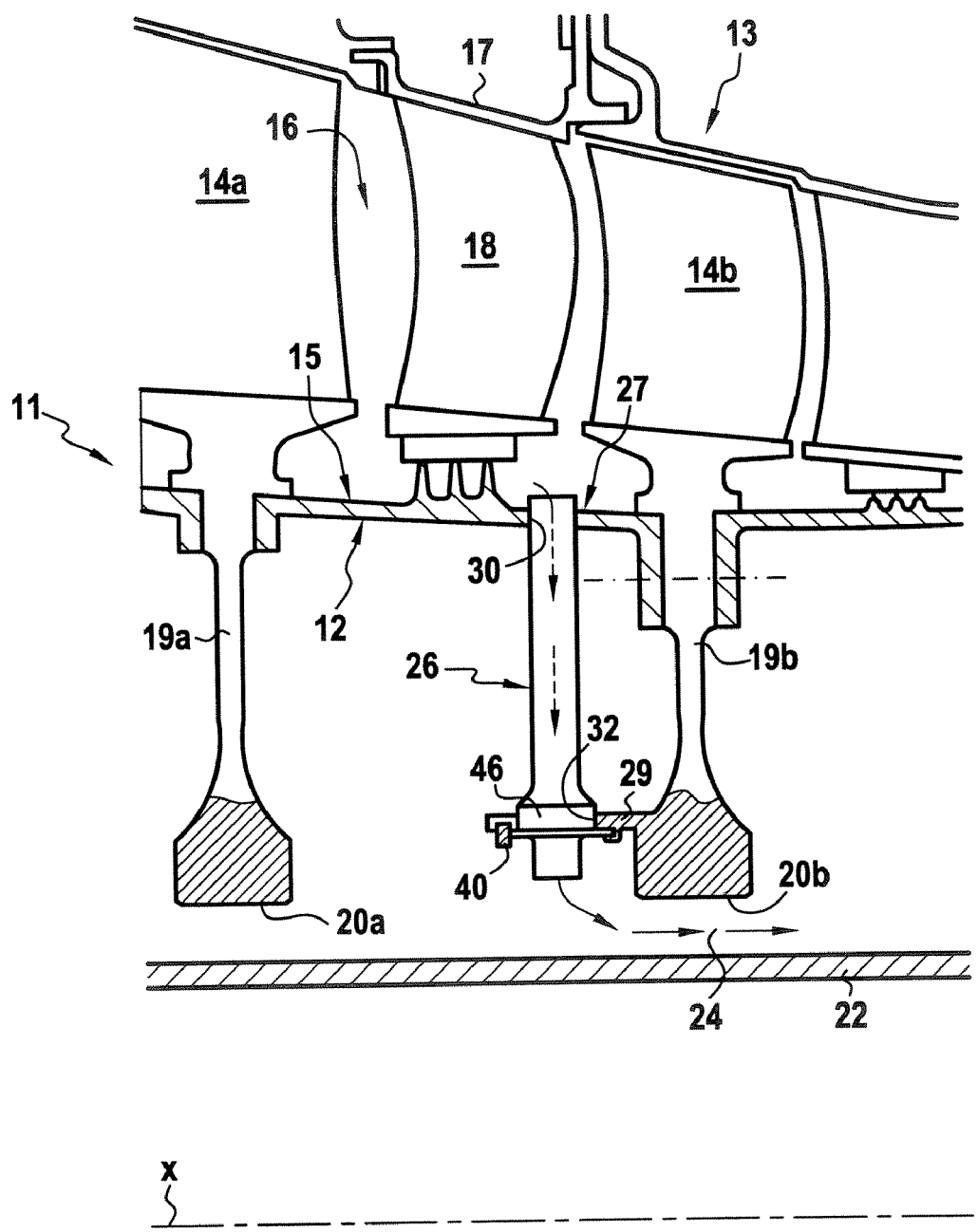
FIG. 1 is a partial view in cross-section of a compressor equipped with the improvement according to the invention.

Referring more particularly to FIGS. 1 to 3, the hub 12 of a rotor 11 of the high pressure compressor 13 of a turbojet engine is depicted. It is known that this hub 12 has rotationally movable blades 14a, 14b that extend radially outside its outer wall 15, an annular air stream 16 being defined between this wall and a housing 17. Fixed blades 18 are arranged axially between the movable blades. The hub comprises an assemblage of disks 19a, 19b extending radially towards the inside from the outer wall of the hub 12 delimiting the air stream 16. Each disk has a central bore 20a, 20b through which a shaft 22 extends. For the requirements of cooling certain elements, it is necessary to take off air from the stream in order to reinject it into the space 24 delimited by the bores of the disks and the shaft 22. This takeoff is carried out by a series of radially oriented takeoff pipes 26, regularly distributed circumferentially. In the example, twelve takeoff pipes 26 are provided, installed between two coaxial collars of the rotor of said compressor, respectively an outer collar 27 and an inner collar 29. The space outside the outer collar 27 communicates with the stream 16 of the compressor. In the example depicted, said outer collar 27 in fact forms part of the outer wall 15 of the hub delimiting the air stream. As for the inner collar 29, this is defined laterally and coaxially with the axis of rotation x on the side of one of the disks, here the disk 19b.

According to an important feature of the invention, one end of each pipe (the end directed towards the outside) is fitted in a hole 30 in said outer collar 27. Furthermore, each pipe is fitted in a hole 32 in said inner collar 29. Finally, locking means are defined between all the pipes 26 on the one hand and the inner collar 29 on the other hand.

In the example depicted (FIGS. 2 to 4) the locking means are distributed as follows:
 on each pipe 26, a flat flange 35 is fixed to the outside of the pipe at a radial distance corresponding to the position of the inner collar. This flange is provided with a flat section 36;
 on said inner collar 29, an annular slot 38 with lateral opening is defined on the internal face of said inner collar whilst a removable annular limit stop 40 projects from this internal face, parallel to said annular slot 38. In the example depicted, said annular limit stop 40 is a retaining ring mounted in a groove 42 in said inner collar 29.

In the example depicted, said annular slot 38 with lateral opening is defined in an annular rib 44 projecting from the internal face of said inner collar.

When the pipe 26 is in position and is locked with said inner collar, the flange 35 is fitted in the slot 38 and its flat section 36 is substantially in contact with said annular limit stop 40.

Further, advantageously, each pipe comprises a boss 46 with widened circular cross-section, adjacent to the flange 35. The hole 32 made in said inner collar 29 has a diameter corresponding to that of said boss 46. Of course, when the pipe is in position, the boss 46 is located in this hole 32. A channel 49 is made between the edge of the inner collar 29 and each hole 32. Such a channel has a width sufficient to make it possible to fit the pipe 26 into the hole, this width being of course less than the diameter of the boss.

In the example of FIGS. 1 to 3, the outer end of the pipe 26 is simply fitted by sliding into the corresponding hole 30 in the outer collar 27.

It follows from the preceding description that the assembly of the pipes can be carried out extremely simply. The limit stop 40 being removed, the operator can present each pipe 26 opposite a corresponding channel 49 in the inner collar 29, fit the pipe into this channel, the boss 46 being for the moment situated at a radial distance less than that where said inner collar is situated. Then, once the pipe 26 is in the hole 32 in the inner collar, the operator moves it radially towards the outside in order to fit its outer end into the hole 30 in the outer collar 27. During this operation, the boss 46 is fitted in the hole in the inner collar, the operator having taken care to place the flat section 36 opposite the annular slot with lateral opening 38. When the flange 35 comes into contact with the internal face of the inner collar, the operator turns the pipe by 180° until the flat section 36 is positioned opposite the location of the retaining ring. From then on, the pipe is held in position by the fitting of its flange 35 in the slot 38. All twelve pipes are mounted in this way. Finally, all that is needed is to install the retaining ring (limit stop 40) in its groove 42 to permanently immobilize all the pipes.

In this embodiment, the loads due to centrifugal force are exerted between the flanges 35 and the inner collar 29.

Figure 4:
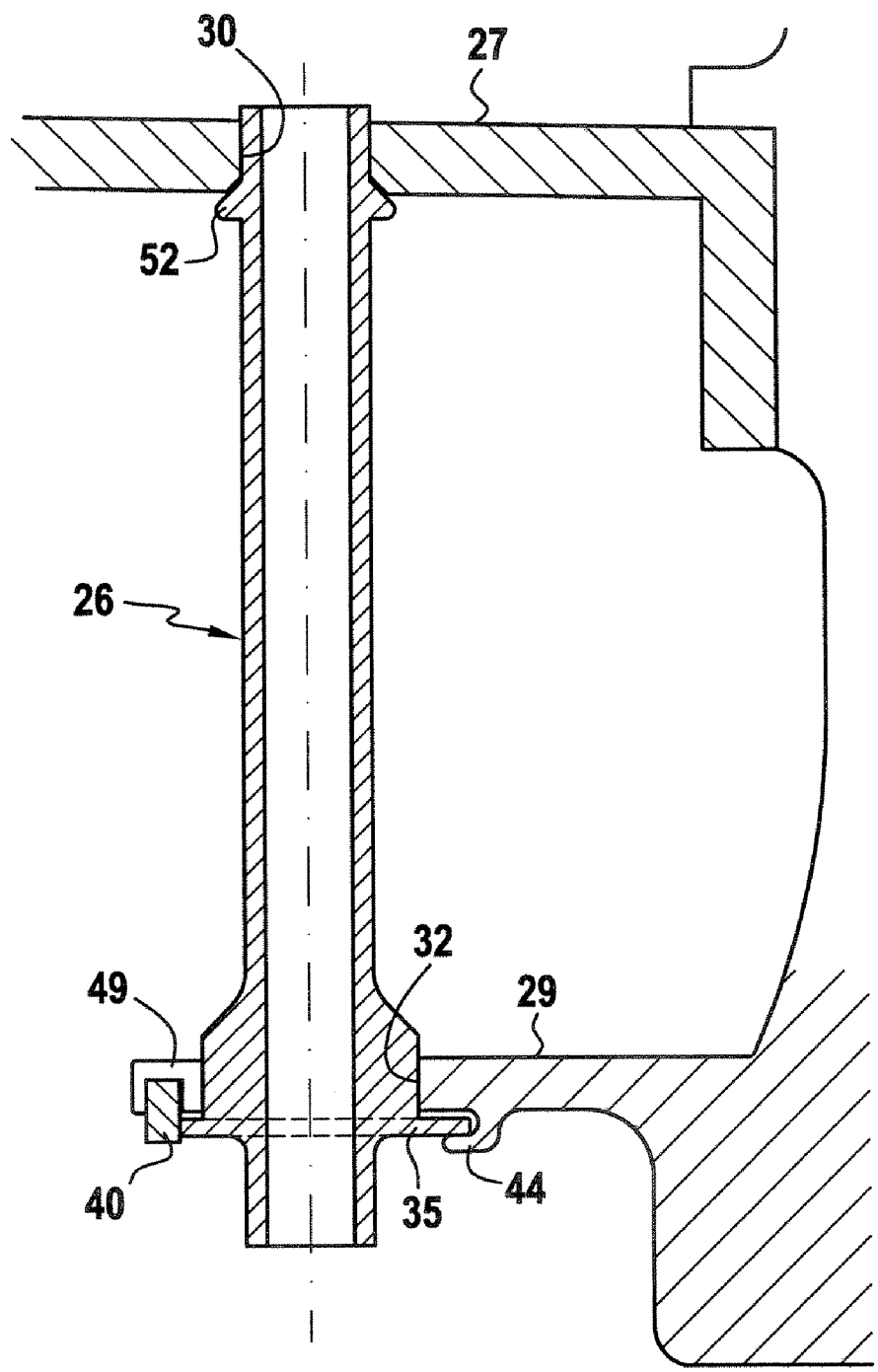
FIG. 4 is a partial schematic view along a radial cross-section illustrating a variant.

In the embodiment of FIG. 4 where the analogous structural elements have the same numerical references and will not be described again, the outer end of each pipe 26 which is fitted in a corresponding hole 30 at the outer collar 27 comprises a shoulder 52, here conical in shape, resting against a corresponding surface of the internal face of said outer collar 27. In this embodiment, the centrifugal force that is exerted on the takeoff pipe 26 results in an abutment between the shoulder 52 and the internal face of said outer collar 27. The flange 35 has only a locking function at assembly.

The invention claimed is:

1. A compressor with centripetal air offtake, which includes several radially oriented pipes, regularly distributed circumferentially, said pipes being installed between two coaxial collars of a rotor of said compressor, respectively an outer collar and an inner collar, a space outside said outer collar communicating with an air stream of said compressor, wherein one end of each pipe is fitted in a hole in said outer collar, wherein each pipe is fitted in a hole in said inner collar and wherein a locking mechanism, defined between such a pipe and said inner collar, comprises:

a flange fixed to each pipe, provided with a flat section;
   an annular slot with lateral opening, defined on the internal face of said inner collar and a removable annular limit stop projecting from said internal face, parallel to said annular slot;
   said flange being fitted in said slot and its flat section being opposite said annular limit stop.

2. The compressor as claimed in claim 1, wherein said annular limit stop is a retaining ring mounted in a groove in said inner collar.

3. The compressor as claimed in claim 2, wherein said annular slot with lateral opening is defined in an annular rib projecting from the internal face of said inner collar.

4. The compressor as claimed in claim 2, wherein each pipe comprises a boss with widened circular cross-section and wherein each hole made in said inner collar has a diameter corresponding to that of said boss, said hole accommodating said boss.

5. The compressor as claimed in claim 4, wherein a channel is made between the edge of said inner collar and each hole, and wherein this channel has a width sufficient to fit said pipe into said hole.

6. The compressor as claimed in claim 2, wherein an outer end of said pipe is fitted by sliding into the hole in said outer collar.

7. The compressor as claimed in claim 6, wherein the outer end of each pipe, fitted in each respective hole of said outer collar, comprises a shoulder resting against the internal face of this outer collar.

8. The compressor as claimed in claim 1, wherein said annular slot with lateral opening is defined in an annular rib projecting from the internal face of said inner collar.

9. The compressor as claimed in claim 8, wherein each pipe comprises a boss with widened circular cross-section and wherein each hole made in said inner collar has a diameter corresponding to that of said boss, said hole accommodating said boss.

10. The compressor as claimed in claim 9, wherein a channel is made between the edge of said inner collar and each hole, and wherein this channel has a width sufficient to fit said pipe into said hole.

11. The compressor as claimed in claim 8, wherein an outer end of said pipe is fitted by sliding into the hole in said outer collar.

12. The compressor as claimed in claim 11, wherein the outer end of each pipe, fitted in each respective hole of said outer collar, comprises a shoulder resting against the internal face of this outer collar.

13. The compressor as claimed in claim 8, wherein said outer collar forms part of a wall delimiting the air stream.

14. An aircraft turbojet engine, said engine comprising a compressor as claimed in claim 8.

15. The compressor as claimed in claim 1, wherein each pipe comprises a boss with widened circular cross-section and wherein each hole made in said inner collar has a diameter corresponding to that of said boss, said hole accommodating said boss.

16. The compressor as claimed in claim 15, wherein a channel is made between the edge of said inner collar and each hole, and wherein this channel has a width sufficient to fit said pipe into said hole.

17. The compressor as claimed in claim 1, wherein an outer end of said pipe is fitted by sliding into the hole in said outer collar.

18. The compressor as claimed in claim 17, wherein the outer end of each pipe, fitted in each respective hole of said outer collar, comprises a shoulder resting against the internal face of this outer collar.

19. The compressor as claimed in claim 1, wherein said outer collar forms part of a wall delimiting the air stream.

20. An aircraft turbojet engine, said engine comprising a compressor as claimed in claim 1.

* * * * *